UNITED STATES PATENT OFFICE.

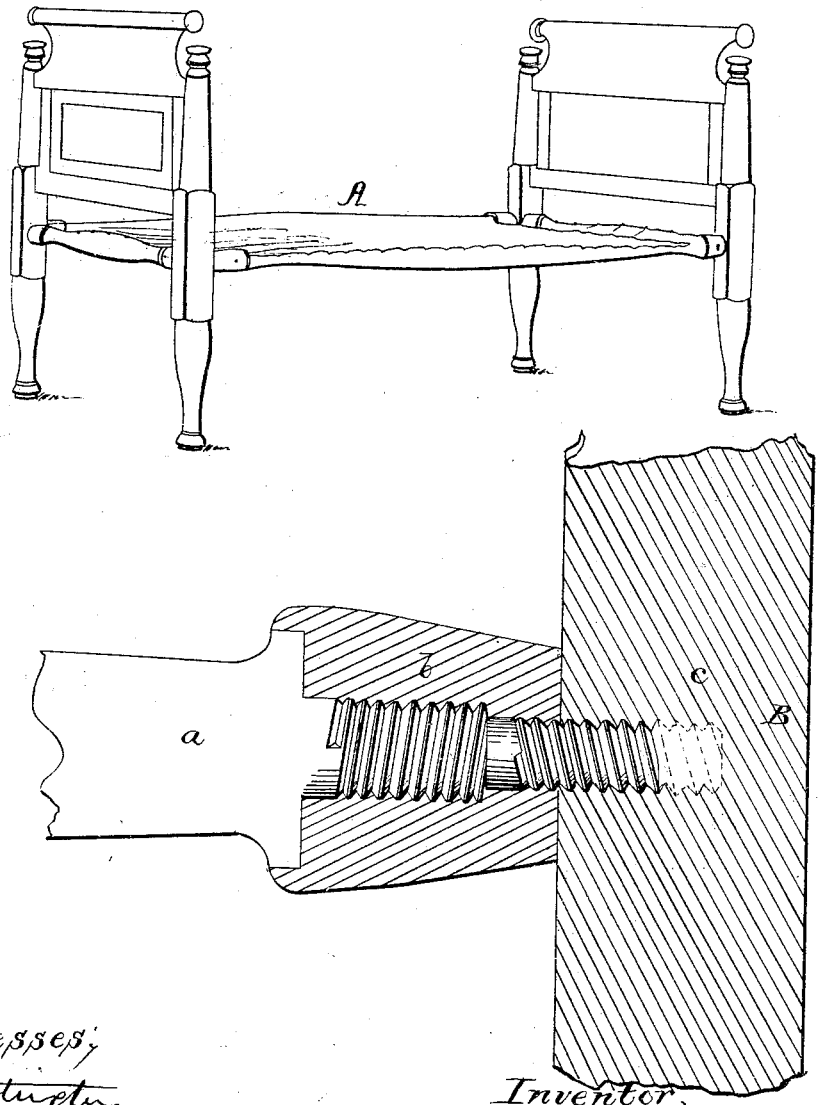
J. P. Allen,
Bedstead Fastening.
N° 2,326.  Patented Nov. 3, 1841.
Witnesses:
Inventor,
John P. Allen

JOHN P. ALLEN, OF MANCHESTER, MASSACHUSETTS.

MANNER OF SECURING AND FASTENING THE RAILS OF BEDSTEADS.

Specification of Letters Patent No. 2,326, dated November 3, 1841.

*To all whom it may concern:*

Be it known that I, JOHN P. ALLEN, of Manchester, in the county of Essex and Commonwealth of Massachusetts, have invented a new and useful Improvement in Securing and Fastening Bedsteads, which I denominate the "Right and Left Double-Screw-Windlass Bedstead," and that the following is a full and exact description of the construction and operation of my said improvement, namely—

My invention consists in a right and left screw on each end of the beams or sides and ends of the bedstead applied in the following manner: The screw on each end of the beam, the one being to the right, the other to the left, is about three inches in length and one and a half inches in diameter or of other convenient dimensions; from thence the beam is left about one inch and three quarters in diameter, and about three inches more in length, and the screw on the last mentioned part is the reverse of that on the first mentioned part, the one being cut to the right, and the other to the left, and after the distance thus given for the screws, at the ends of the several beams, the beams are left of the usual size of what are called swelled beams; in the swelled beam bedstead, then a nut is turned to fit the beam and the last mentioned screw on the beam. Said nut is then turned onto the beam, and the post of the bedstead is prepared for the first mentioned screw. The beams are then entered or screwed into the posts until they come to the several nuts applied as aforesaid. In this situation, the lever may be used to strain the sacking in the same manner as in the windlass bedstead; and when sufficiently strained by the lever, the nuts aforesaid by means of a small lever, are screwed back against the post, which makes the bedstead perfectly firm, prevents rocking and leaves no crevice for the escape or concealment of insects. The advantages that this bedstead possesses over all others, are, its firmness in connection with the easy mode of straining the sacking and its neatness presenting a fair and smooth surface.

What I claim as my invention, and desire to secure by Letters Patent, is—

The method herein described of making the joints of the bedstead firm and tight and giving sufficient play to the screws on the ends of the rails for tightening the sacking by means of the nuts in combination with the rails and right and left threaded screw on the ends of the rails as herein described.

In testimony that the foregoing is a true specification of my said invention I have hereunto set my hand this ninth day of October A. D. 1841.

JOHN P. ALLEN.

Witnesses:
 A. HUNTINGTON,
 WM. F. KENT.